(12) United States Patent
Becnel et al.

(10) Patent No.: US 12,711,353 B2
(45) Date of Patent: Aug. 18, 2026

(54) 3-BRANCH DEEP NEURAL NETWORK

(71) Applicant: University of Utah Research Foundation, Salt Lake City, UT (US)

(72) Inventors: Thomas Becnel, Salt Lake City, UT (US); Pierre-Emmanuel Gaillardon, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 1165 days.

(21) Appl. No.: 17/592,230

(22) Filed: Feb. 3, 2022

(65) Prior Publication Data

US 2023/0244906 A1 Aug. 3, 2023

(51) Int. Cl.
*G06N 3/044* (2023.01)

(52) U.S. Cl.
CPC .................................... *G06N 3/044* (2023.01)

(58) Field of Classification Search
CPC ...................................................... G06N 3/044
See application file for complete search history.

(56) References Cited

U.S. PATENT DOCUMENTS

| | | | | |
|---|---|---|---|---|
| 10,565,434 | B2 | 2/2020 | Vemulapalli et al. | |
| 11,034,357 | B2 | 6/2021 | Lakshmi Narayanan et al. | |
| 2019/0114391 | A1 | 4/2019 | Jaganathan et al. | |
| 2020/0110981 | A1* | 4/2020 | Yan | G06N 3/049 |
| 2020/0242471 | A1* | 7/2020 | Busch | G06N 3/08 |
| 2020/0251183 | A1 | 8/2020 | Kashefhaghighi et al. | |
| 2020/0389188 | A1 | 12/2020 | Belzer et al. | |
| 2022/0036123 | A1* | 2/2022 | Cummings | G06N 20/00 |
| 2022/0108175 | A1* | 4/2022 | Lyske | G06F 16/783 |
| 2022/0327335 | A1* | 10/2022 | Thopalli | G06Q 10/08 |
| 2023/0033548 | A1* | 2/2023 | Takkar | G06T 7/97 |

FOREIGN PATENT DOCUMENTS

| | | | |
|---|---|---|---|
| CN | 111009129 | A | 4/2020 |
| CN | 111582397 | A | 8/2020 |
| CN | 112559585 | A | 3/2021 |

OTHER PUBLICATIONS

Karim et al. (Multivariate LSTM-FCNs for Time Series Classification, Jul. 2019, pp. 1-18) (Year: 2019).*

(Continued)

*Primary Examiner* — George Giroux
(74) *Attorney, Agent, or Firm* — Thorpe North & Western, LLP

(57) ABSTRACT

Techniques for implementing a multi-branch neural network in an edge network are disclosed, where the multi-branch neural network is configured to infer latent features from fused sensor time series exogenous inputs. A multi-branch neural network is configured to include a LSTM branch and two FC branches. The multi-branch neural network is deployed on an edge node, which receives raw input from sensors. The raw input is fed into the LSTM branch and into the second FC branch. The raw input is fed into a normalization block that performs feature-wise normalization to generate normalized input. The normalized input is fed into the first FC block. The multi-branch neural network is used to generate a latent inference based on outputs provided by the LSTM branch and the two FC branches.

19 Claims, 10 Drawing Sheets

(56) References Cited

OTHER PUBLICATIONS

Singh et al. (Feature wise normalization: An effective way of normalizing data, Sep. 2021, pp. 1-14) (Year: 2021).*

Wang et al. (Time Series Classification from Scratch with Deep Neural Networks: A Strong Baseline, Dec. 2016, pp. 1-9) (Year: 2016).*

Tian et al. (A Deep Neural Network Model for Short-Term Load Forecast Based on Long Short-Term Memory Network and Convolutional Neural Network, Dec. 2018, pp. 1-13) (Year: 2018).*

Hu et al. (Squeeze-and-Excitation Networks, May 2019, pp. 1-13) (Year: 2019).*

Deng et al. (ST-Norm: Spatial and Temporal Normalization for Multi-variate Time Series Forecasting, Aug. 2021, pp. 269-278) (Year: 2021).*

De Bezenac et al. (Normalizing Kalman Filters for Multivariate Time Series Analysis, Dec. 2020, pp. 1-13) (Year: 2020).*

* cited by examiner

*Figure 6*
Temperature
Humidity
$PM_{2.5}$
DAQ $NO_2$ | OX.
DAQ CO | RED.
DAQ $O_3$ | RED.
DAQ $O_3$ | OX.
6321
8497
F8CD
C274
HW
1.0
0.8
0.6
0.4
0.2

Correlation
600

Table
700

TABLE I: Performance comparison of the proposed model

| Holdout Node | MLR | | | MLP | | | NARX | | | MLSTM-FCN | | | DEENET (This Work) | | |
|---|---|---|---|---|---|---|---|---|---|---|---|---|---|---|---|
| | MAD | MSE | $R^2$ | MAD | MSE | $R^2$ | MAD | MSE | $R^2$ | MAD | MSE | $R^2$ | MAD | MSE | $R^2$ |
| 075B | 0.064 | 0.0167 | 0.546 | 0.068 | 0.0162 | 0.567 | 0.131 | 0.0241 | 0.871 | 0.024 | 0.0015 | 0.960 | 0.021 | 0.0011 | 0.971 |
| 6321 | 0.065 | 0.0102 | 0.731 | 0.066 | 0.0094 | 0.752 | 0.044 | 0.0052 | 0.865 | 0.037 | 0.0019 | 0.950 | 0.032 | 0.0017 | 0.954 |
| 8497 | 0.070 | 0.0063 | 0.828 | 0.068 | 0.0072 | 0.810 | 0.059 | 0.0070 | 0.851 | 0.039 | 0.0022 | 0.940 | 0.034 | 0.0015 | 0.960 |
| F8CD | 0.068 | 0.0066 | 0.826 | 0.063 | 0.0071 | 0.809 | 0.130 | 0.0286 | 0.771 | 0.029 | 0.0015 | 0.960 | 0.027 | 0.0014 | 0.964 |
| C274 | 0.084 | 0.0079 | 0.782 | 0.083 | 0.0075 | 0.801 | 0.054 | 0.0081 | 0.880 | 0.037 | 0.0021 | 0.943 | 0.036 | 0.0020 | 0.945 |
| EA5D | 0.080 | 0.0162 | 0.545 | 0.082 | 0.0144 | 0.612 | 0.050 | 0.0064 | 0.858 | 0.030 | 0.0016 | 0.956 | 0.027 | 0.0014 | 0.962 |
| FD74 | 0.071 | 0.0180 | 0.509 | 0.072 | 0.0161 | 0.567 | 0.058 | 0.0077 | 0.834 | 0.044 | 0.0031 | 0.916 | 0.038 | 0.0021 | 0.944 |
| 8AC9 | 0.080 | 0.0081 | 0.766 | 0.079 | 0.0075 | 0.797 | 0.107 | 0.0158 | 0.885 | 0.048 | 0.0057 | 0.834 | 0.029 | 0.0026 | 0.925 |
| Mean | 0.073 | 0.0113 | 0.691 | 0.073 | 0.0107 | 0.714 | 0.079 | 0.0129 | 0.852 | 0.036 | 0.0024 | 0.933 | 0.030 | 0.0017 | 0.953 |

*Figure 7*

3-BRANCH DEEP NEURAL NETWORK

This invention was made with government support under grant D19 AP00028 awarded by the Department of Defense/DARPA. The government has certain rights in the invention.

BACKGROUND

A "neural network" is a set of algorithms and computing constructs that are generally modeled after the human brain. At a high level, a neural network is designed to recognize patterns and then provide meaning to those patterns. Different types of data can be fed as input into a neural network, and that neural network can be trained and perhaps even tuned in a manner so as to process the input data and provide relevant output data.

Typically, a neural network includes a dense array of connected processing nodes, similar to the neurons in a person's brain. Each node can be connected to other nodes that exist in layers above or below that node. Data is moved through the network, often in a feed-forward direction, and the node "fires" when it passes information on to a next node in the network.

Generally, a network analyzes data and makes a classification decision by assigning each node a "weight." This weight represents the value of information that is provided to a particular node. Stated differently, the weight generally refers to how helpful the node was in correctly identifying and classifying information. When a node receives information from another node, that node determines a weight for the received information. Different weight thresholds can be established.

A neural network can be trained to recognize patterns and characteristics within a body of data. Different types of neural networks may be better suited to process some types of data as compared to other types of neural networks. Training a neural network can take a considerable amount of time and a considerable amount of resources. Having a trained network in place, however, can provide substantial benefits when trying to analyze data. What is needed, therefore, is an improved technique for designing and implementing a neural network to analyze data.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein relate to systems, devices, and methods for implementing a multi-branch neural network in an edge network, where the multi-branch neural network is configured to infer latent features from fused sensor time series exogenous inputs.

Some embodiments configure a multi-branch neural network to include a long short-term memory (LSTM) branch, a first fully convolutional (FC) branch, and a second FC branch. The LSTM branch, the first FC branch, and the second FC branch operate in parallel with one another. The multi-branch neural network is deployed on one or more edge nodes of an edge network. These edge nodes are configured to receive raw input from one or more sensors operating in the edge network. The embodiments feed the raw input into the LSTM branch and into the second FC branch. The LSTM branch is configured to identify long-term trends within the raw input, and the second FC branch is configured to identify magnitudes and trends between features included in the raw input. The raw input is also fed into a normalization block that performs feature-wise normalization on the raw input to generate normalized input. The normalized input is then fed into the first FC block, which is configured to identify short-term relational temporal dynamics between features included in the normalized input. The embodiments use the multi-branch neural network to generate a latent inference based on outputs provided by the LSTM branch, the first FC branch, and the second FC branch.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 7 illustrates a table showing a performance comparison between various different designs of a neural network.

DETAILED DESCRIPTION

Figure 1:
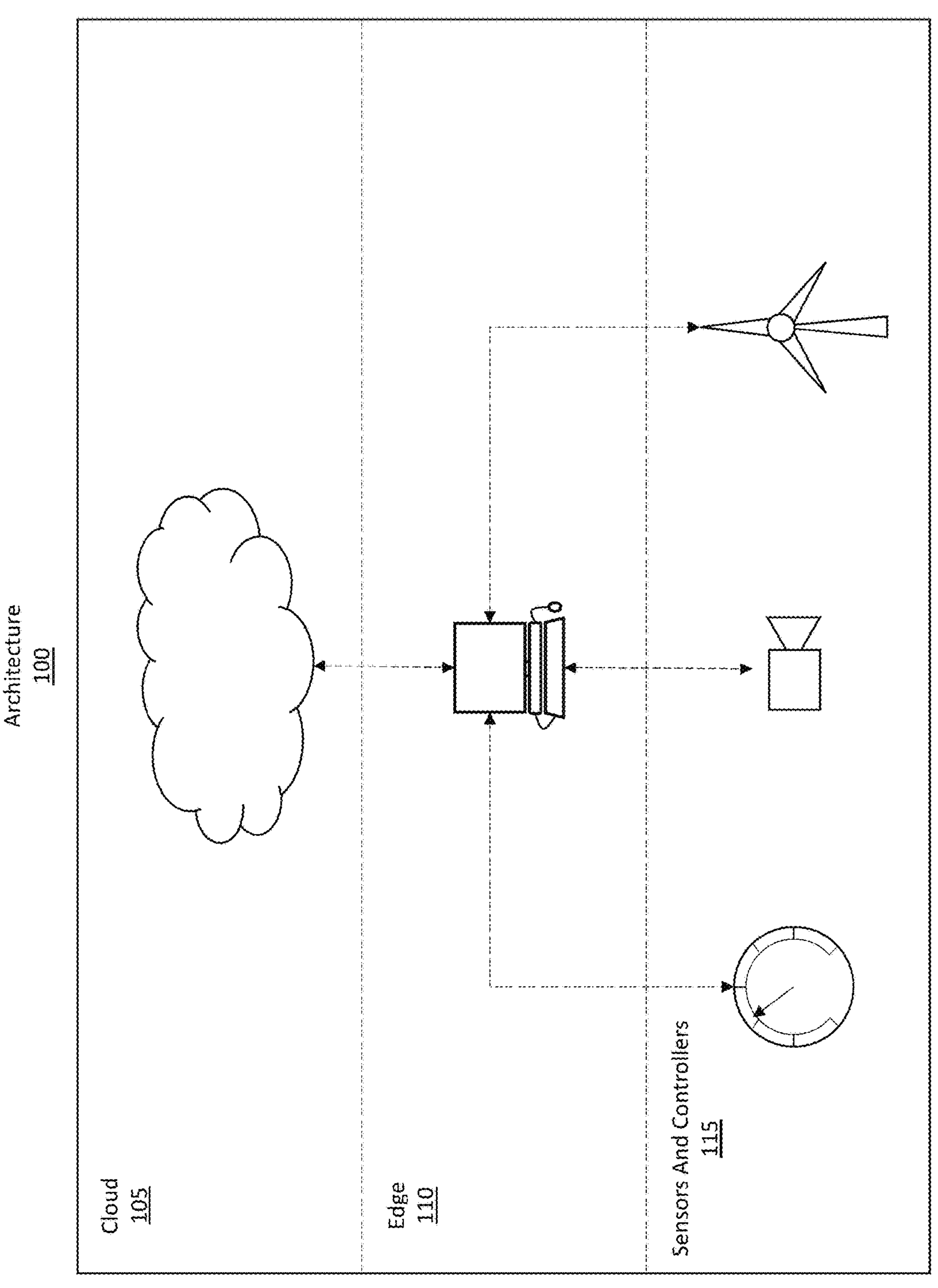
FIG. 1 illustrates an example of a network architecture, including an edge network.

Embodiments disclosed herein relate to systems, devices, and methods for implementing a multi-branch neural network in an edge network, where the multi-branch neural network is configured to infer latent features from fused sensor time series exogenous inputs.

Some embodiments configure a multi-branch neural network to include a long short-term memory (LSTM) branch, a first fully convolutional (FC) branch, and a second FC branch. The LSTM branch, the first FC branch, and the second FC branch operate in parallel with one another. The multi-branch neural network is deployed onto an edge node of an edge network. The edge node is configured to receive raw input from one or more sensors. The embodiments feed the raw input into the LSTM branch and into the second FC branch. The raw input is also fed into a normalization block that performs feature-wise normalization on the raw input to generate normalized input. The normalized input is then fed into the first FC block. The embodiments use the multi-branch neural network to generate a latent inference based on outputs provided by the LSTM branch, the first FC branch, and the second FC branch. An example of a latent inference can be an inferred ozone measurement, which is inferred based on environmental sensor data.

Examples of Technical Benefits, Improvements, and Practical Applications

The following section outlines some example improvements and practical applications provided by the disclosed embodiments. It will be appreciated, however, that these are just examples only and that the embodiments are not limited to only these improvements.

The disclosed embodiments bring about numerous benefits, improvements, and practical applications to the technical field of data modeling. Beneficially, the disclosed techniques are directed to deep learning methodologies that are able to infer unseen data (e.g., perhaps ozone levels) by learning complex trends and the distribution of the fused time-series inputs (e.g., environmental sensor data). The disclosed hybrid architecture beneficially combines a multivariate Long Short-Term Memory (LSTM) branch and two fully convolutional (FC) branches to extract time-series trends as well as short-term features.

The architecture operates by normalizing one or more of the input vectors. The embodiments are then able to magnify certain features in order to better distinguish trends between series. As will be discussed in more detail later, tests were performed in order to demonstrate the broad applicability of this architecture and corresponding inference technique. Such tests used data from a currently deployed pollution monitoring network of low-cost sensors to infer hourly ozone concentrations at the device level. Results indicate that the disclosed techniques greatly outperformed traditional linear regression techniques by 6 times as well as state-of-the-art multivariate time-series techniques by 1.4 times in mean squared error. Beneficially, the inferred quantities were able to achieve lower variability than the primary sensors which produce the input data.

Additional benefits include the ability to perform these inference operations at the network's edge. In doing so, the embodiments significantly reduce the amount of bandwidth that is used by the system (e.g., because the processing can be performed at the edge instead of in the cloud). The embodiments also achieve significant power reductions over traditional systems. Furthermore, the disclosed embodiments can achieve faster inference times than traditional systems. Accordingly, these and numerous other benefits will now be described in more detail throughout the remaining sections of this document.

Network Edge

FIG. 1 shows an example architecture 100 that helps to illustrate an edge network. In particular, the architecture 100 is shown as including a cloud 105 (which includes large datacenters), an edge 110, and a number of sensors and controllers 115. Edge networking or edge computing refers to a scenario in which computing and data storage are brought as close to the point of request as possible (e.g., as close to the sensors and controllers 115 as possible). By performing operations at the edge 110, the requested content can be provided with low latency and can also save bandwidth.

Creating an edge computing system is performed by decentralizing the operations that have traditionally been performed by the centralized data centers. It is also performed by using smart objects and gateways to provide the services traditionally provided by cloud computing. As will be discussed in more detail later, the disclosed embodiments can be deployed to the edge 110 and can operate in that edge 110.

Architecture

Figure 2A:
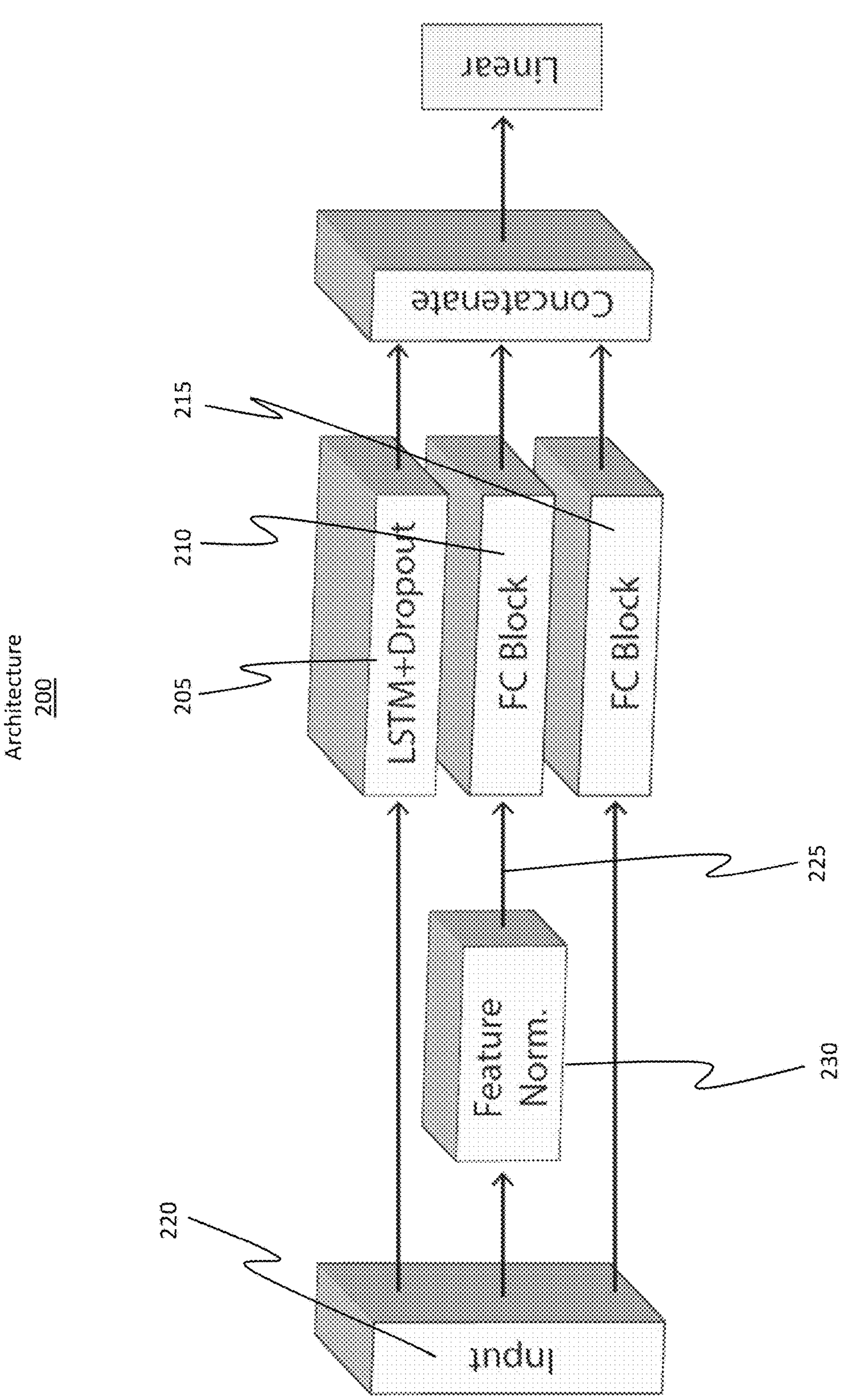
FIG. 2A illustrates an architecture of a multi-branch neural network designed to perform the disclosed operations.

Attention will now be directed to FIG. 2A, which illustrates an example architecture 200 that can be implemented in the edge 110 of FIG. 1. Architecture 200 includes a novel 3-branch system comprised of a Long Short-Term Memory (LSTM) block 205 stacked with two Fully Convolutional (FC) blocks (e.g., FC block 210 and FC block 215). Network input tensors of shape (N, M) are bifurcated and passed through a simple stage of feature-wise normalization. Raw input 220 is fed into the LSTM branch (e.g., LSTM block 205) and FC branch (e.g., FC block 215), while normalized inputs 225 (which are normalized using the feature normalization block 230) are fed into the second FC branch (i.e. FC block 210). In this way, the disclosed architecture 200 is able to learn short-term dynamics between input features via the normalized-input FC branch (e.g., the FC block 210), as well long-term trends and periodic behavior from the LSTM branch and raw-input FC branch (e.g., the LSTM block 205 and the FC block 215).

The LSTM branch (e.g., the LSTM block 205) is comprised of a vanilla LSTM layer with an internal state vector dimensionality of a selected value (e.g., perhaps a value of 8). The LSTM layer is followed by a dropout layer with a dropout rate selected to be a particular value (e.g., perhaps a value of 0.8) to prevent overfitting of the training data.

Figure 2B:
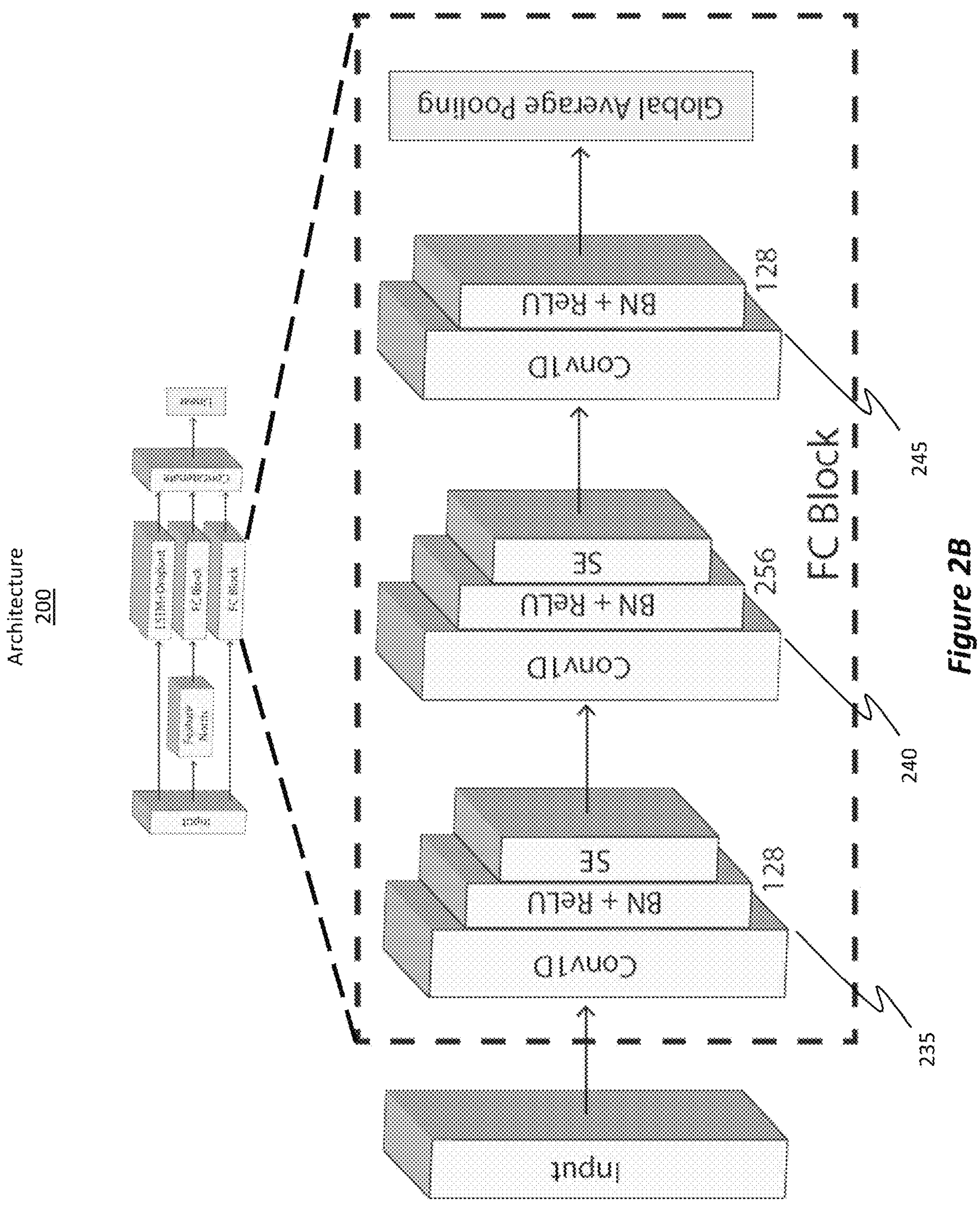
FIG. 2B illustrates a blown-up illustration of a portion of the neural network.

As shown in FIG. 2B, each FC block (e.g., FC block 210 and FC block 215) contains three stacked convolutional layers (e.g., layers 235, 240, and 245) with {128, 256, 128} filters in each layer. Each FC layer is followed by batch normalization (e.g., "BN") and rectified linear unit ("ReLU") activation. Convolutional operations are performed by 1-D kernels with sizes {8, 5, 3}, respective to each FC layer.

The embodiments also include appended Squeeze-and-Excite ("SE") blocks to the end of the first two ReLU activations. SE blocks model interdependencies between channels and adaptively recalibrate features. The SE block has the effect of helping the network generalize between inputs and prevent overfitting. To this end, the inclusion of the SE blocks in the disclosed network improved accuracy at a marginal cost of a 2-10% increase in the network size.

Through experimental evaluation, it was found that the improved accuracy of adding a second LSTM branch trained on normalized inputs is marginal and therefore can optionally be omitted. For evaluation purposes, the disclosed model was generated using the Keras python library with Tensorflow as the backend.

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 3:
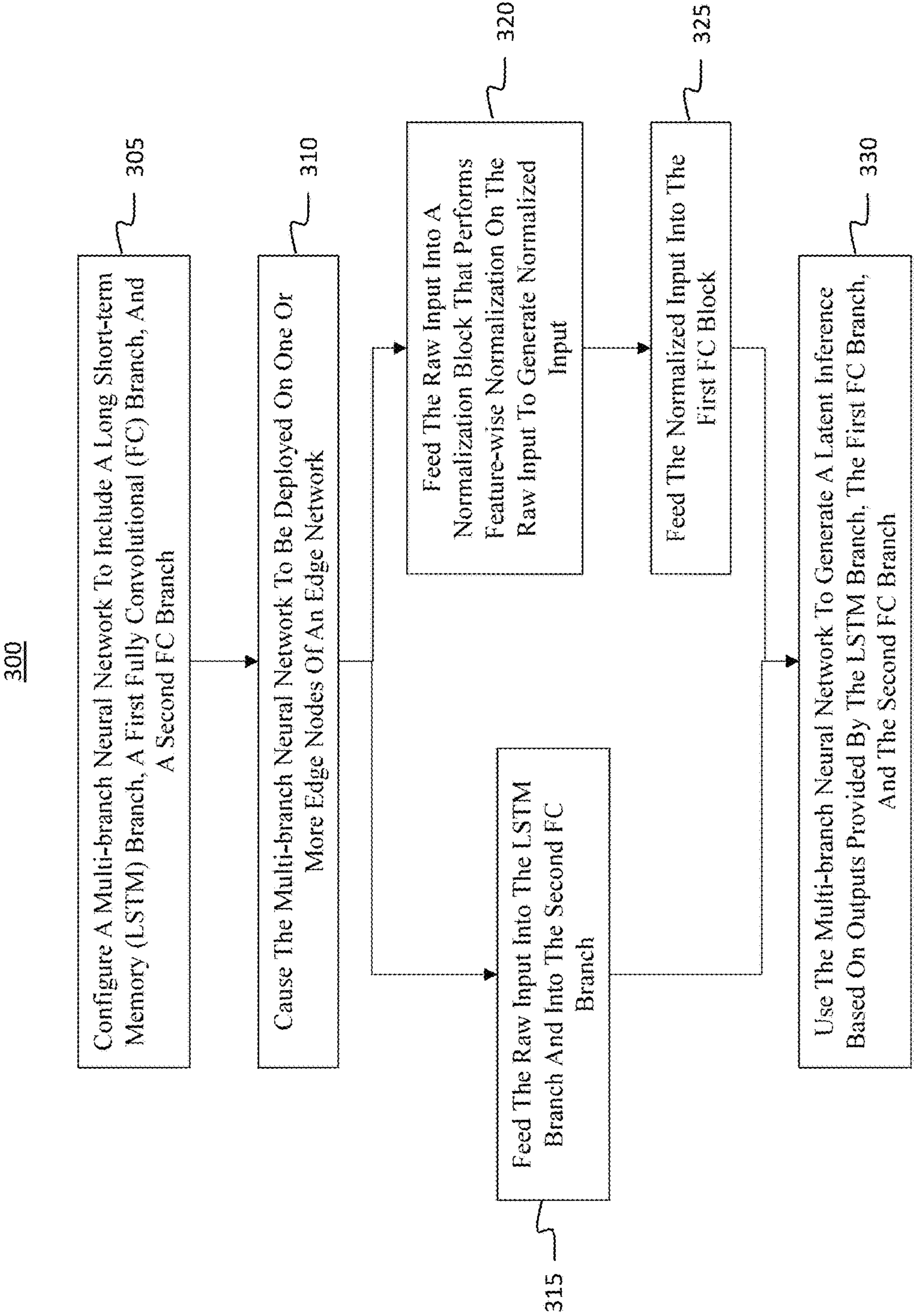
FIG. 3 illustrates a flowchart of an example method for implementing a multi-branch neural network to analyze data.

Attention will now be directed to FIG. 3, which illustrates a flowchart of an example method 300 for implementing a multi-branch neural network in an edge network, where the multi-branch neural network is configured to infer latent features from fused sensor time series exogenous inputs. Method 300 can be implemented within the architecture 100 of FIG. 1 and using the architecture 200 of FIG. 2A.

Method 300 includes an act (act 305) of configuring a multi-branch neural network to include a long short-term memory (LSTM) branch, a first fully convolutional (FC) branch, and a second FC branch. The LSTM branch, the first FC branch, and the second FC branch operate in parallel with one another. In some cases, the network includes only the one LSTM branch and no other LSTM branches. Optionally, an additional LSTM branch can be included, and normalized data can be fed into that additional LSTM branch.

In some cases, the provided LSTM branch includes a vanilla LSTM layer with an internal state vector dimensionality set to a preselected value (e.g., perhaps 8). In some cases, the LSTM branch also includes a dropout layer having a dropout rate set to a preselected value (e.g., perhaps 0.8) to prevent overfitting. The FC branches can be configured to include three stacked convolutional layers with {128, 256, 128} filters in each layer.

Optionally, the FC branches can include batch normalization and rectified linear unit (ReLU) activation. That is, each stacked convolutional layer can be succeeded by batch normalization and ReLU activation. In some cases, a squeeze-and-excite (SE) block is appended to an edge of the ReLU activations for the first and second layers but not for the third layer. Stated differently, SE blocks can be appended to edges of only two of the ReLU activations.

Act 310 includes causing the multi-branch neural network to be deployed on one or more edge nodes of an edge network. The one or more edge nodes are configured to receive raw input from one or more sensors operating in the edge network. Optionally, the raw input can include loosely periodic, multivariate time series data that is acquired by the sensors. In some example scenarios, the sensors can be environmental sensors that track and monitor environmental conditions, such as oxygen levels, $CO_2$ levels, etc. In some cases, the sensors are Internet of Things (IoT) sensors. The sensors can be indoor sensors or outdoor sensors. The sensors can be wired or wireless.

Act 315 includes feeding the raw input into the LSTM branch and into the second FC branch. The LSTM branch is configured to identify long-term trends within the raw input. The second FC branch is configured to identify magnitudes and trends between features included in the raw input.

In parallel with act 315, act 320 includes feeding the raw input into a normalization block that performs feature-wise normalization on the raw input to generate normalized input. In some implementations, the normalization block performs the feature-wise normalization on the raw input by normalizing the raw input along a temporal axis of a multivariate input tensor. Optionally, various network input tensors can be bifurcated and can be passed into the normalization block to generate the normalized input. Further details on these aspects will be provided later.

Act 325 includes feeding the normalized input into the first FC block. Because the first FC block operates on normalized data, the first FC block is now configured to identify short-term relational temporal dynamics between features included in the normalized input.

Act 330 includes using the multi-branch neural network to generate a latent inference based on outputs provided by the LSTM branch, the first FC branch, and the second FC branch. An example of a so-called "latent inference" can be the ozone level of a particular environment. Of course, this is but one example only, and other types of inferences can be made.

In some embodiments, the multi-branch neural network is trained on a platform that contains or that includes the same type of sensors as the sensors that are out in the edge network. Optionally, the multi-branch neural network can be trained across at least 300 epochs with a batch size of at least 128. The process of deploying the multi-branch network can then include porting the network from the platform to the network edge.

In some embodiments, a power cost for using the multi-branch neural network to generate the latent inference on the one or more edge nodes is less than about 23 mW per inference. Often, the power cost is about 1.2 mW per inference. A time consumed for using the multi-branch neural network to generate the latent inference on the one or more edge nodes is typically less than about 27 ms.

Accordingly, the disclosed embodiments relate to a 3-branch deep neural network (DNN) architecture that can be directly implemented in a constrained hardware design, such as a microcontroller or embedded hardware accelerator to enable local inference capabilities. The integration into low-cost, lower power sensor architectures can help achieve significantly improved sensor network performance by pushing some level of analysis and decision-making capability to the edge with concomitant benefits of faster reaction times by individual nodes, if necessary. Edge sensor devices can leverage this capability to enhance functionality such as inferring latent features and trends from gathered multivariate datasets and data streams. This attribute proves beneficial when nonlinear events occur, and unseen data creates consequences that are to be analyzed and a response formulated. The disclosed principles enable a deep learning methodology based on complex trends and distribution of fused time-series inputs, representing a paradigm shift in sensor data collection, fusion, and interpretation.

One basis of the disclosed principles is a novel hybrid architecture that combines a multivariate Long Short-Term Memory (LTSM) branch and two convolutional branches so that time-series trends can be extracted along with short-term features. The approach focuses on using the normalization of input vectors to magnify features and better capture trends between series. When integrated into sensors (e.g., perhaps sensors used in pollution monitoring networks for ozone levels) or into other edge devices, the embodiments can provide substantial performance improvements in inferring latent features (e.g., hourly ozone concentrations)

at the edge or device level without sending data back to the core for processing and analysis. Testing this technique on a practical application such as pollution monitoring demonstrates the ability to achieve lower variability in the inferred data compared to the input data gathered by the primary sensors.

Accordingly, the techniques described herein focus on using raw and normalized feature sets in parallel to model general relationships between features and extract dynamics that enable neural responses irrespective of the subdued scale of occurrence. A novel, multi-branch deep neural network (DNN) architecture that fuses LTSM and two multi-layer Fully Convolutional (FC) branches are employed in a lightweight inference technique tailored for edge device deployments. The lower inter-model variability demonstrated by this technique from the inferred quantities helps drive network capability to perform nonlinear calibration of the sensed inputs, which provides a substantial advantage over currently used models where inter-sensor variance calibration poses a significant issue.

Accordingly, the disclosed architectures use a novel multi-branch DNN approach that generates multivariate time-series inferences of latent variables such that trends between input features and short temporal dynamics are captured and integrated effectively into the overall system capabilities. By preventing these dynamics from getting washed out due to input feature scales, the embodiments enable amplification of events that improve sensor network characteristics such as inference, calibration, and forecasting.

Example Use Scenarios

Constructing healthy and sustainable urban societies typically relies on efficient environmental monitoring and rapid interpretation of the data. The proliferation of large-scale Wireless Sensor Networks (WSN) in recent years has greatly contributed to a vast procurement of data spanning many applications, including water quality, pollution, automotive traffic, and distributed power systems.

The advent of large scale urban sensor networks has enabled a paradigm shift of how data is collected and interpreted. By equipping these sensor nodes with emerging low-power hardware accelerators, they become powerful edge devices, capable of locally inferring latent features and trends from their fused multivariate data. Unfortunately, traditional inference techniques are not well suited for operation in edge devices, or those techniques simply fail to capture many statistical aspects of these low-cost sensors. As a result, these traditional methods struggle to accurately model nonlinear events.

However, the large influx of environmental data sampled by WSNs brings its own challenges. Where data is traditionally transferred to a centralized cloud for processing, the large amount of data collected by hundreds or thousands of network nodes can make this unfeasible due to network bandwidth or processing limitations. Thanks to the simultaneous advancement of powerful edge processors and hardware accelerators, a great deal of computation is moved away from the cloud and into the WSN nodes themselves.

One type of WSN analysis that transfers well to the edge computing paradigm is time series forecasting. A single WSN node is typically comprised of several low-cost environmental sensors that sample independently and fuse their temporal measurements. Due to the loose coupling and periodicity of many environmental events, there exist rich unobserved phenomena (i.e. latent features) that can be extracted directly from the sampled data.

Traditional forecasting techniques generally make use of Autoregressive (AR) methodologies because of their ability to use to past observations to make estimates, with one of the most popular being the Nonlinear Autoregressive Network with Exogenous Inputs (NARX) model. However, in recent years, hybrid Deep Neural Network (DNN) models have proven to be effective tools for time series tasks, and often outperform AR techniques. Despite the predominate success of some of the traditional techniques, they fail to address the inherent statistical properties of datasets generated from low-cost environmental sensors, such as the posterior dependencies between these exogenous inputs.

The disclosed embodiments are focused on DEENET (DEEp inference using Normalized Exogenous Time series). DEENET is a lightweight, deep learning inference technique specifically for deployment on edge devices. DEENET is targeted at estimating latent time series by analyzing the nonlinear response of fused multi-sensor inputs.

As described earlier, the disclosed embodiments employ a novel multi-branch deep neural network (DNN) architecture comprised of a Long Short-Term Memory (LSTM) branch and two multi-layer Fully Convolutional (FC) branches. A major benefit of the disclosed embodiments is a lightweight normalization stage that rescales the input features prior to input to the FC branch.

By providing both raw and normalized feature sets in parallel, the disclosed network is able to model general relationships between features as well as extract dynamics that would otherwise not trigger neural responses because of their subdued scale. To demonstrate the benefits of the disclosed framework, DEENET was tasked with generating hourly ozone inferences using strictly exogenous input from an active network of low-cost pollution monitors. The testing results show 1.4× mean squared error improvement over current state-of-the-art DNN techniques. Advantageously, the inferred quantities also showed lower inter-model variability than the input driving sensors, which addresses the ability of the network to perform non-linear calibration of the inputs.

Accordingly, the disclosed architecture includes a novel 3-branch architecture, coined DEENET, for fused multi-sensor time-series inference of latent time series from strictly exogenous inputs. The embodiments can implement a back-propagation based training technique that teaches the network relevant distributions between multi-source driving series. The embodiments were tested using a real-world case study of urban ozone inference using a deployed network of low-cost pollution monitors.

Recurrent Neural Networks And Long Short-Term Memory

Recurrent Neural Networks (RNN) are a class of neural networks capable of learning temporal patterns from the input data by maintaining a hidden state vector which is updated during the back-propagation phase of training.

However, RNNs are quite prone to the vanishing gradient problem, which lends to their inability to learn long sequences and thus vanilla RNNs are not typically used in practice. The successor to RNNs, Long Short-Term Memory (LSTM) networks, combat this problem by employing gating mechanisms on the internal state vector. During back-propagation, the smart gating mechanism adaptively decides what information is important, and error is either accumulated or allowed to pass through the cell. In this way, LSTM networks are able to operate on long input sequences, which makes them ideal candidates for time series inference tasks. In an LSTM architecture, the hidden state is replaced by a cell consisting of gating functions and the internal state.

Convolutional Neural Networks

Convolutional operations can be used to extract features from time series data and to solve time-series tasks. Each convolutional block is typically comprised of a set of 1-dimensional convolutional kernels, followed by ReLU activation and batch normalization. The input matrix, or feature map output from a previous layer, is convolved with several convolutional kernels.

Specifically, starting with an input time series feature vector of length $$F_0 : X_t \in R^{F_0}$$

for time step 0<t≤T.

In some embodiments, Tis constant across all features and therefore does not require a padding mechanism. Given L convolutional layers in the convolutional block, a set of 1-dimensional convolutional kernels that capture dynamics of the input can be applied. The filters for each layer are parameterized by the following tensor $$W^l \in R^{F_l * d * F_{l-1}}$$

and biases:

$$b^l \in R^{F_l}$$

where d is the filter duration and l∈{1, . . . , L} is the layer index. For the 7-th layer of the convolutional block, the i-th filter activation $$\hat{E}_t^l \in R^{F_l}$$

is function of the activation matrix $$E^{l-1} \in R^{F_l * T_{l-1}}$$

from the previous layer $$\hat{E}_{i,t}^l = \mathrm{Re}LU\left(b_i^l + \sum_{t'=1}^{d} \left\langle W_{i,t',\cdot}^l, E_{\cdot,t+d-t'}^{l-1} \right\rangle\right)$$

Convolutional block outputs are immediately succeeded by a max pooling layer. Max pooling is a nonlinear down-sampling technique that takes the maximum value over a given window size, across a number of pooling regions Q. Effectively, the resolution of the learned temporal features is reduced to prevent overfitting.

DEENET—A Time Series Inference Framework

DEENET is a hybrid DNN methodology that aims to infer latent features from fused sensor time series input. The inference task can be formulated as a type of multivariate time-series forecasting. However, unlike classical forecasting techniques, which generally use past values of the observed phenomena of interest to perform one-step-ahead predictions, the targeted application is the inference of latent features at the current time step. Therefore, the embodiments instead rely on extracting trends and relationships between the exogenous inputs to estimate the target.

To this end, the disclosed 3-branch architecture is particularly performant at inference from loosely periodic, multivariate time series data acquired by sensors. By providing training data from multiple sources of a given feature (such as multiple identical sensors), the disclosed model learns the a priori distribution of sensor calibration parameters. The trained model can then be ported to any arbitrary network node (not included in the training phase) containing the same platform of sensors and perform high quality inference of the desired target.

Network Input and Normalized Preprocessing Stage

A unique step in the proposed framework is a small preprocessing stage of normalization along the temporal axis of the multivariate input tensor. Rationale for this approach can be demonstrated by way of example.

Figure 4:
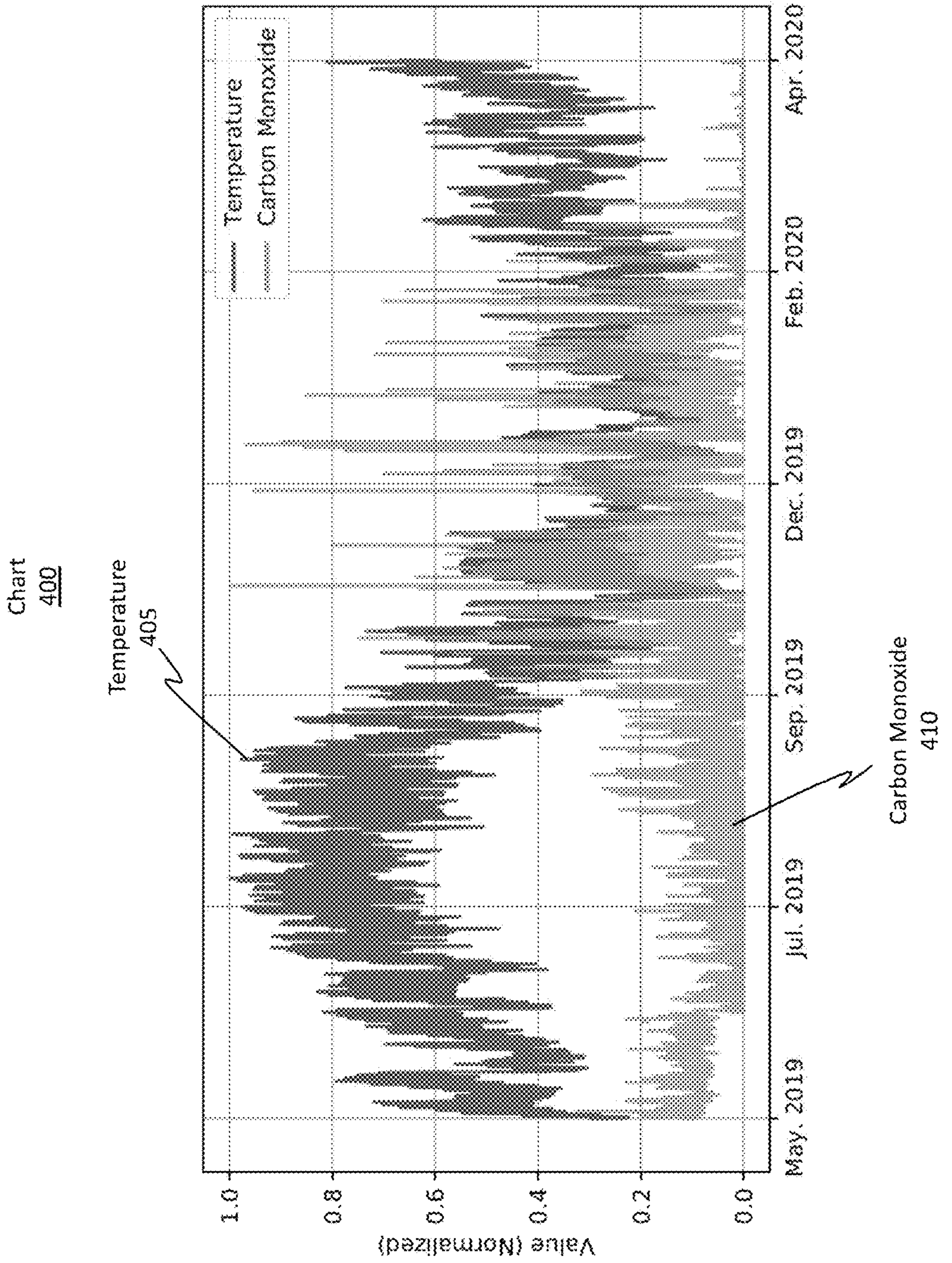
FIG. 4 illustrates a chart depicting a relationship between temperature and carbon monoxide.

FIG. 4 shows a chart 400 of one year of hourly samples from a temperature sensor (i.e. temperature 405) and a Carbon Monoxide (CO) sensor (i.e. carbon monoxide 410) deployed in a dense urban, outdoor environment. Each feature vector has gone through an initial normalization step to fit the datasets in the range [0, +1] to aid in visualization. Temperature measurements display an annual trend with the changing seasons. CO concentrations do not correlate well to temperature, and while there is a large disparity in the scale of the observations between the two features in July 2019, the scales converge in December of the following year.

Figure 5:
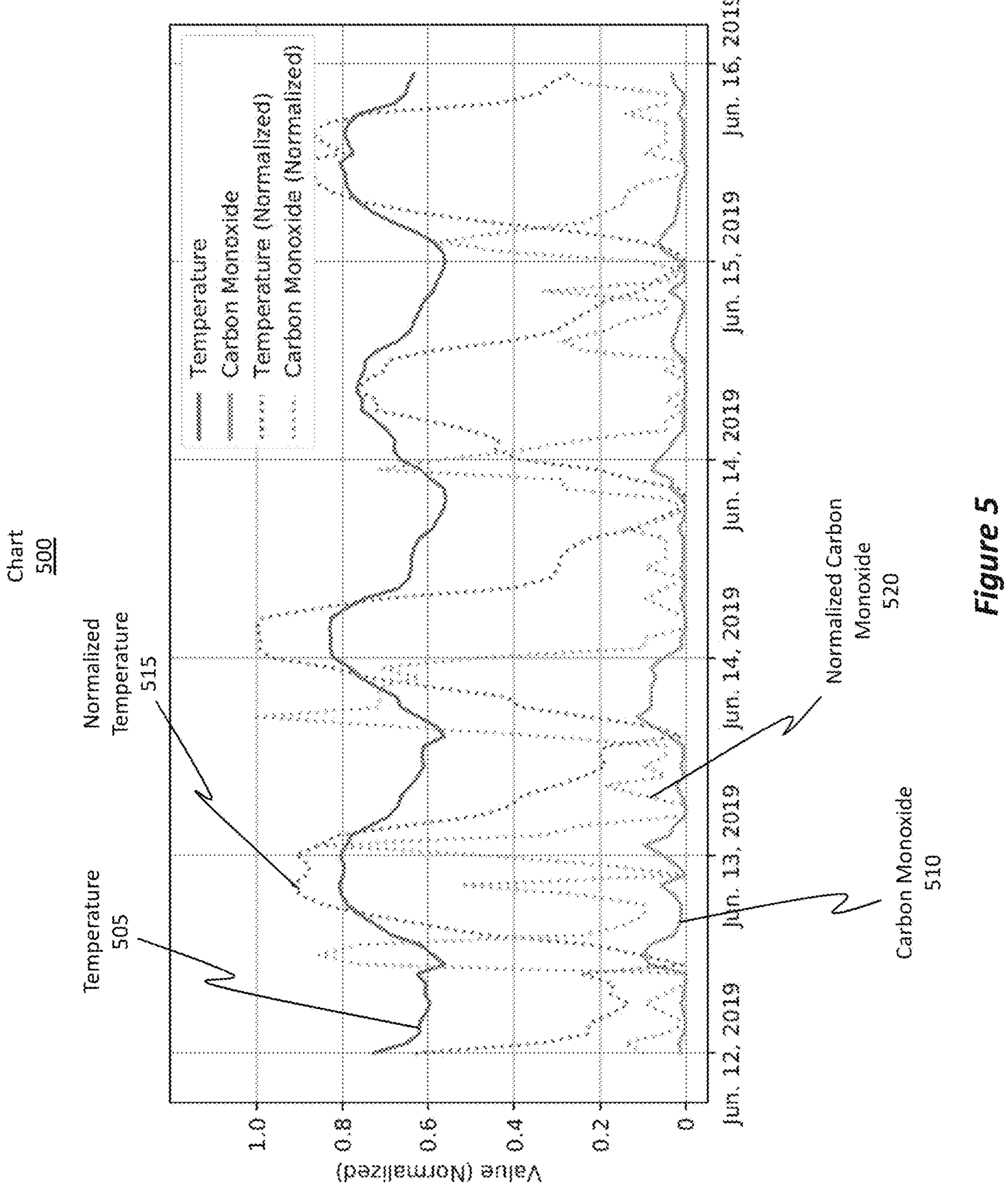
FIG. 5 illustrates another chart showing normalized data compared to raw data.

FIG. 5 shows another chart 500, which is a 100-hour window of the two vectors (e.g., temperature 505 and carbon monoxide 510), taken from FIG. 4, as well as vectors that have been normalized to this window (e.g., normalized temperature 515 and normalized carbon monoxide 520).

From the charts, one can observe the role that normalization plays in amplifying short temporal events. When considering training an FC network on the fused tensor input displayed in FIG. 5, the large disparity in scales will result in convolutional filters that learn general trends, whereas filters trained on the normalized feature sets will tend to learn the relationship between feature dynamics.

Indeed, whereas an FC block operating on the raw inputs will tend to learn magnitudes and trends between features, the same FC block operating on the normalized inputs will learn to pick out relational temporal dynamics between features.

The normalization step is formally defined as:

$$\hat{X}_{m,n} = \frac{X_{m,n} - \min(X_m)}{\max(X_m) - \min(X_m)}$$

where M is the feature vector and N is the subregion time vector.

Experimental Results

The disclosed architecture was trained and evaluated using a publicly available dataset from an actively deployed pollution monitoring network. As part of the tests, the model is evaluated and compared against vanilla Multiple Linear Regression (MLR) Multi-Layer Perceptron (MLP) models to form a baseline, as well as a NARX model and MLSTM-FCN, a state-of-the-art multivariate time series classification technique adapted for the task of latent time series inference.

This section first describes the sensor network from which the experimental dataset was procured. The discussion will then turn to preparing the dataset for the training and inference regimen, then training, then the comparison models, then the evaluation metrics, and finally a discussion of the experimental results.

The experiment used a publicly available dataset known as the AirU Pollution Monitoring Network. AirU is a network of WiFi-enabled IoT edge devices, herein referred to as network nodes, which monitor airborne pollutants. Each node contains temperature, humidity, particulate matter (PM), oxidizing gas species (OX) (primarily $NO_2$), and reducing gas species (RED) (primarily CO) sensors. In the tests, 8 nodes were used, where the nodes were collocated with two reference instruments.

Several high-grade reference instruments maintained by the United States Department of Air Quality (DAQ) are deployed throughout the AirU region. These DAQ sites produce hourly observations for temperature, relative humidity, barometric pressure, $PM_{2.5}$, nitric oxide (NO), $NO_2$, CO, and ozone ($O_3$). The measurements are considered extremely accurate, and thus are referred to as the "ground-truth" data. At two DAQ sites, dubbed Hawthorne (HW) and Rose Park (RP), there are 8 collocated AirU nodes (4 at each site), which act as calibration nodes for the entirety of the network. The dataset used in this experiment was generated by these 8 nodes, with the ozone targets taken from the DAQ ozone reference instruments.

Figure 6:
FIG. 6 illustrates a correlation between various collocated AirU sensors and a corresponding DAQ reference.

To help describe the research interest in the task of ozone inference, reference will now be made to FIG. 6, which displays the correlation 600 between collocated AirU sensors and the corresponding DAQ reference. In lieu of space, only the sensors at the DAQ Hawthorne site are shown, but the Rose Park site contains very similar results. FIG. 6 shows that the AirU temperature, relative humidity, and $PM_{2.5}$ sensors all correlate quite well between one another, as well as the DAQ reference instruments. The gas sensors, however, exhibit very low correlations with the DAQ $NO_2$, CO, and $O_3$ reference instruments, likely due to the poor selectivity and nonlinear response of the gas sensors. However, the relatively high correlations between the low-cost gas sensors indicates that they are functioning properly. Notably, the ozone concentrations do not respond linearly to the gas sensors on the AirU platform, and a nonlinear inference scheme will likely outperform a simple linear regression. Based on that understanding, MLR is likely not suitable to model the complex relationship between ozone and the observed parameters.

Data from the DAQ sites is sampled at 1-hour intervals. To match this interval, minute-by-minute data from the collocated AirU nodes is averaged into matching 1-hour intervals. Ozone measurements obtained by the DAQ reference instruments are concatenated to each AirU node dataset and matched according to hourly timestamps.

Training data is provided by 7 of the 8 collocated nodes, and the 8th node is defined as the holdout. In this way, the statistics of the environmental sensors of the node are completely unknown during validation and testing. The nonlinear mapping of the model structure allows the model to make probabilistic assumptions of the various sensor distributions in order to make the most accurate ozone concentration inference. Each feature is scaled to the range [0, +1] across the time frame. For the 7 training sensors, data is sectioned into individual samples via a temporal sliding window with width 100, such that each sample is a 2-D tensor $$X_i \in R^{M*N}$$

where M is the 7 input features (temperature, humidity, $PM_{1.0}$, $PM_{2.5}$, $PM_{10.0}$, RED, and OX values), and N is 100 consecutive hourly time steps, where $\{-100<n\leq 0\}$. Each sample is assigned a corresponding target measurement, which is the collocated DAQ ozone concentration at $\{n=0\}$ (current time), relative to the sample time frame.

Samples are then added indiscriminately to the training pool and randomly shuffled prior to each epoch. Similarly, samples for the holdout node are added to the testing pool. In total, there are roughly 55,000 training samples and 8,000 test samples for each of the 8 models. Network models are trained across 300 epochs with a batch size of 128. The mean-squared error is defined as the loss metric, the Adam optimization algorithm is used as the back-propagation technique with a static learning rate of 0.01.

Similar to a cross-validation approach, the 8 separate models are trained, with each model targeting one of the 8 AirU nodes as the holdout. In this way, it is possible to demonstrate robust and generalized results across multiple nodes, as well as compare the variability between models.

The disclosed model was then compared to two state-of-the-art inference techniques: NARX, and MLSTM-FCN, a state-of-the-art multivariate time-series classification neural network architecture which was adapted for real-valued inference. A baseline was established by training Multiple Linear Regression (MLR) and a vanilla Multi-layer Perceptron (MLP) with a single hidden layer.

The described models are evaluated using Mean Squared Error (MSE), Median Absolute Deviation (MAD), and Coefficient of Determination ($R^2$). The Mean Error (ME) was also used to define inter-sensor variance. These metrics are well-regarded and used extensively throughout the field of time series modelling.

Table 700 in FIG. 7 shows the experimental results of the described models on the inference of ozone concentrations from a dataset of exogenous sensor data. It is noted that MLR achieves the lowest scores across all evaluation metrics, which is unsurprising as the dataset exhibits nonlinear behavior. Similarly, a simple MLP does not contain the required complexity to sufficiently learn and model the numerous temporal and inter-feature dependencies and relationships. MLR and MLP are used to establish a baseline across the evaluation metrics. The NARX model shows surprisingly poor error and deviation results, but outperforms the baseline in correlation. This behavior is expected as the NARX model is able to incorporate past dependencies. On this task, DEENET displays state-of-the-art performance, beating MLSTM-FCN on average by 1.2×, 1.41×, 1.02× across MAD, MSE, and $R^2$, respectively. The disclosed technique also outperforms MLSTM-FCN on every holdout node across the evaluation metrics, including up to 2.2× improvement in MSE.

Figure 8:
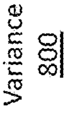
FIG. 8 illustrates the variance for the input features across 8 AirU nodes.
Figure 8:
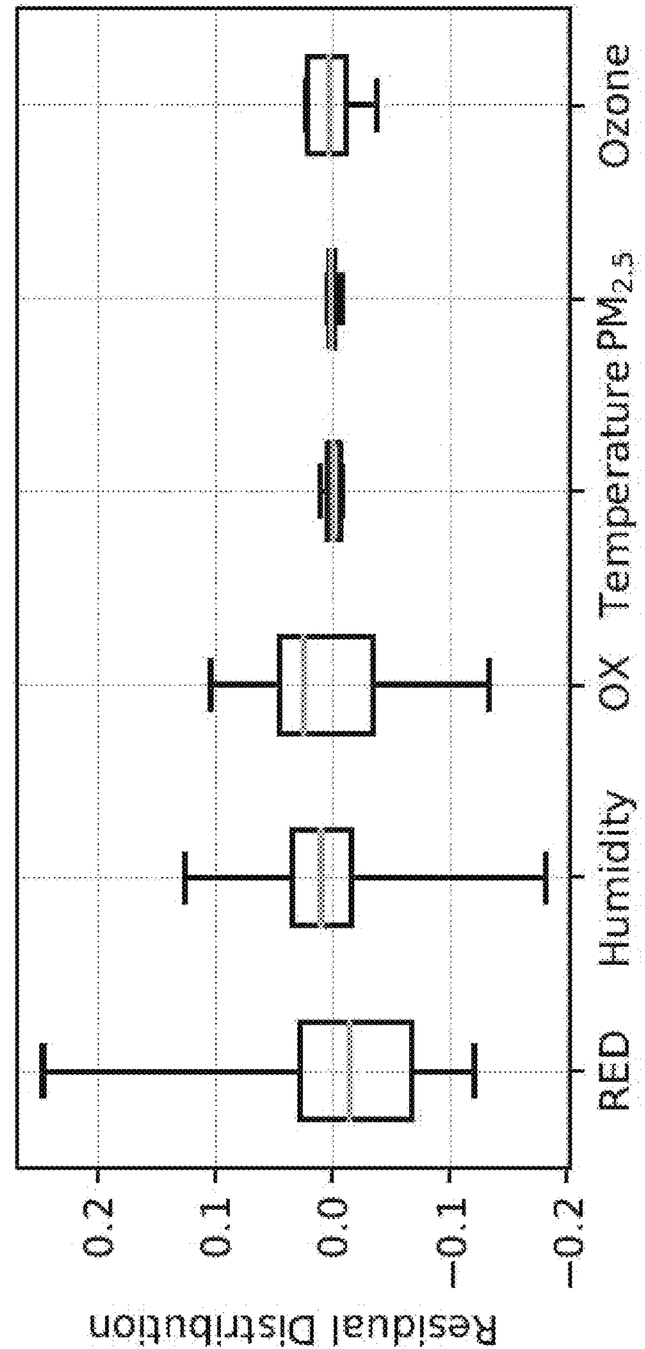

DEENET also displays the ability to reduce variance across models when compared to the variance of the input sensor types. FIG. 8 shows the variance 800 for the input features across the 8 AirU nodes, where variance is calculated from the Mean Error (ME) for each sensor on each node. That is, FIG. 8 shows the inter-sensor variability for each of the environmental sensors used in the study and inferred ozone concentrations. The underlying data for each boxplot is generate from the mean error (ME) for each of the 8 sensors. The variance for each distribution is $\{1.3e^{-2}, 7.7e^{-3}, 7.0e^{-3}, 5.2e^{-5}, 1.7e^{-5}, 5.1e^{-4}\}$ for RED, humidity, OX, temperature, $PM_{2.5}$, and ozone, respectively in FIG. 8.

The inferred ozone measurements exhibit 25.4×, 15.1×, and 13.7× lower model-to-model variance than RED, humidity, and OX sensors, respectively. Effectively this demonstrates that the network has the ability to perform internal calibration on the input features. As more nodes are added to the training pool, the variance of the ozone inference will likely decrease further.

Power Efficiency

The discussion will now turn to investigating the feasibility of deploying DEENET to low power edge devices, such as the Google Edge TPU, NVIDIA Jetson Nano, or Intel Movidius, though for the sake of brevity, only the Google Edge TPU is assessed. The Edge TPU on MobileNet V1 is benchmarked as containing 4.2 million parameters. By comparison, the disclosed network contains 756,000 parameters (82% fewer parameters than MobileNet V1). Tests reported 23 mW/inference and an average inference time of 27 ms. By extrapolating the network size reduction to the reported power, one can expect a power cost of roughly 1.2 mW/inference, which is well within the power budget for many edge networks.

Accordingly, the disclosed embodiments address the task of multivariate time-series inference of latent variables with the adoption of a novel multi-branch DNN architecture. By providing both raw and normalized exogenous inputs, the disclosed network is able to capture trends between input features as well as short temporal dynamics that are normally washed out due to the input feature scales. The inputs are fed into a novel 3-branch network architecture comprised of a LSTM block and two parallel Fully Convolutional blocks. When employed with the task of ozone inference using inputs from a network of low-cost environmental sensors and no observed ozone measurements, the network outperforms current DNN techniques by 1.4×. The model also displays a remarkable decrease in variance between models when compared to the inter-sensor variance of the supplementary driving sensors, which demonstrates the ability of the technique to act as a form of nonlinear calibration of the inputs.

Example Computer/Computer Systems

Figure 9:
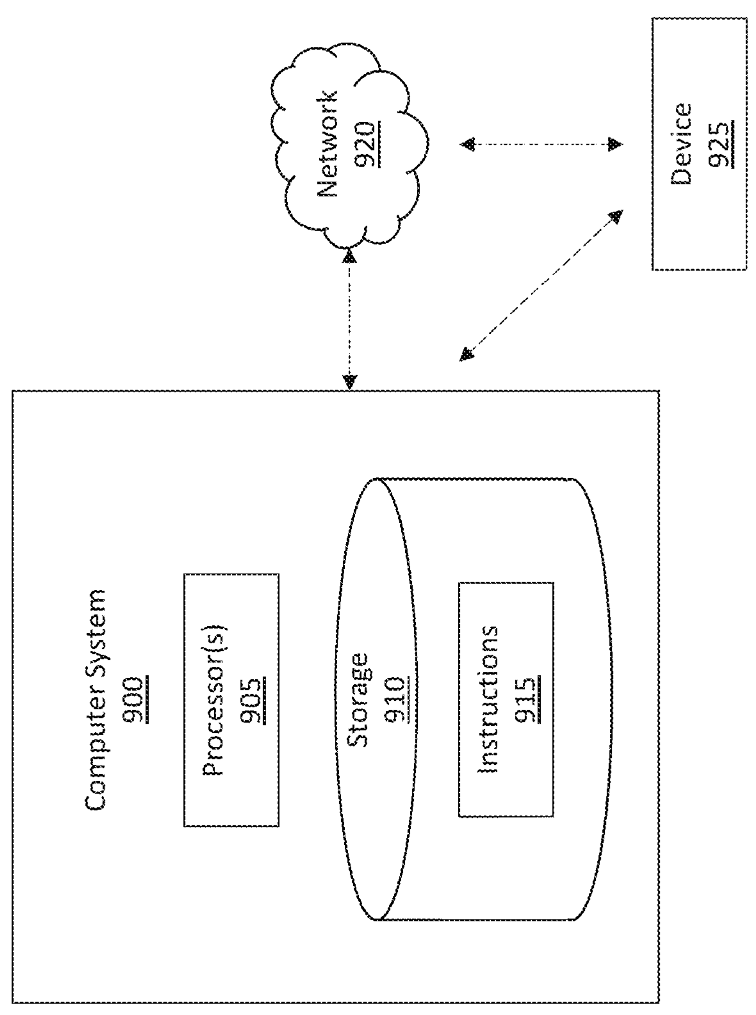
FIG. 9 illustrates an example of a computer system capable of performing any of the disclosed operations and capable of operating in a network's edge.

Attention will now be directed to FIG. 9 which illustrates an example computer system 900 that may include and/or be used to perform any of the operations described herein. Computer system 900 can operate in the edge 110 of FIG. 1 and can be configured to perform the method 300 of FIG. 3.

Computer system 900 may take various different forms. For example, computer system 900 may be embodied as a tablet, a desktop, a laptop, a mobile device, or a standalone device, such as those described throughout this disclosure. Computer system 900 may also be a distributed system that includes one or more connected computing components/devices that are in communication with computer system 900.

In its most basic configuration, computer system 900 includes various different components. FIG. 9 shows that computer system 900 includes one or more processor(s) 905 (aka a "hardware processing unit") and storage 910.

Regarding the processor(s) 905, it will be appreciated that the functionality described herein can be performed, at least in part, by one or more hardware logic components (e.g., the processor(s) 905). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," or "engine" can refer to hardware processing units or to software objects, routines, or methods that may be executed on computer system 900. The different components, modules, engines, and services described herein may be implemented as objects or processors that execute on computer system 900 (e.g. as separate threads).

Storage 910 may be physical system memory, which may be volatile, non-volatile, or some combination of the two. The term "memory" may also be used herein to refer to non-volatile mass storage such as physical storage media. If computer system 900 is distributed, the processing, memory, and/or storage capability may be distributed as well.

Storage 910 is shown as including executable instructions 915. The executable instructions 915 represent instructions that are executable by the processor(s) 905 of computer system 900 to perform the disclosed operations, such as those described in the various methods.

The disclosed embodiments may comprise or utilize a special-purpose or general-purpose computer including computer hardware, such as, for example, one or more processors (such as processor(s) 905) and system memory (such as storage 910), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Furthermore, computer-readable storage media, which includes physical computer storage media and hardware storage devices, exclude signals, carrier waves, and propagating signals. On the other hand, computer-readable media that carry computer-executable instructions are "transmission media" and include signals, carrier waves, and propagating signals. Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phasechange memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 900 may also be connected (via a wired or wireless connection) to external sensors (e.g., one or more remote cameras) or devices via a network 920. For example, computer system 900 can communicate with any number devices (e.g., device 925) or cloud services to obtain or process data. In some cases, network 920 may itself be a cloud network. Furthermore, computer system 900 may also be connected through one or more wired or wireless networks to remote/separate computer systems(s) that are configured to perform any of the processing described with regard to computer system 900.

A "network," like network 920, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 900 will include one or more communication channels that are used to communicate with the network 920. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for implementing a multi-branch neural network in an edge network, where the multi-branch neural network is configured to infer latent features from fused sensor time series exogenous inputs, said method comprising:

configuring a multi-branch neural network to include a long short-term memory (LSTM) branch, a first fully convolutional (FC) branch, and a second FC branch, wherein the LSTM branch, the first FC branch, and the second FC branch operate in parallel with one another;

causing the multi-branch neural network to be deployed on one or more edge nodes of an edge network, wherein the one or more edge nodes are configured to receive raw input from one or more sensors operating in the edge network;

feeding the raw input into the LSTM branch and into the second FC branch, wherein the LSTM branch is configured to identify long-term trends within the raw input, and wherein the second FC branch is configured to identify magnitudes and trends between features included in the raw input;

feeding the raw input into a normalization block that performs feature-wise normalization on the raw input to generate normalized input, wherein the normalization block performs the feature-wise normalization on the raw input by normalizing the raw input along a temporal axis of a multivariate input tensor;

feeding the normalized input into the first FC branch, wherein the first FC branch is configured to identify short-term relational temporal dynamics between features included in the normalized input; and using the multi-branch neural network to generate a latent inference based on outputs provided by the LSTM branch, the first FC branch, and the second FC branch.

2. The method of claim 1, wherein the raw input includes multivariate time series data acquired by the one or more sensors.

3. The method of claim 1, wherein the multi-branch neural network is trained on a platform comprising a same type of sensors as the one or more sensors, and wherein deploying the multi-branch neural network includes porting the multi-branch neural network from the platform.

4. The method of claim 1, wherein network input tensors are bifurcated and passed into the normalization block to generate the normalized input.

5. The method of claim 1, wherein the LSTM branch includes a LSTM layer with an internal state vector dimensionality set to a preselected value.

6. The method of claim 1, wherein the LSTM branch includes a dropout layer having a dropout rate set to a preselected value to prevent overfitting.

7. The method of claim 1, wherein the first FC branch includes three stacked convolutional layers with {128, 256, 128} filters in each layer.

8. The method of claim 1, wherein the first FC branch includes batch normalization and rectified linear unit (ReLU) activation.

9. The method of claim 8, wherein a squeeze-and-excite (SE) block is appended to an edge of the ReLU activation.

10. A computer system configured to implement a multi-branch neural network in an edge network, where the multi-branch neural network is configured to infer latent features from fused sensor time series exogenous inputs, said computer system comprising:

one or more processors; and one or more computer-readable hardware storage devices that store instructions that are executable by the one or more processors to cause the computer system to:

configure a multi-branch neural network to include a long short-term memory (LSTM) branch, a first fully convolutional (FC) branch, and a second FC branch, wherein the LSTM branch, the first FC branch, and the second FC branch operate in parallel with one another;

cause the multi-branch neural network to be deployed on one or more edge nodes of an edge network, wherein the one or more edge nodes are configured to receive raw input from one or more sensors operating in the edge network;

feed the raw input into the LSTM branch and into the second FC branch, wherein the LSTM branch is configured to identify long-term trends within the raw input, and wherein the second FC branch is configured to identify magnitudes and trends between features included in the raw input;

feed the raw input into a normalization block that performs feature-wise normalization on the raw input to generate normalized input, wherein the normalization block performs the feature-wise normalization on the raw input by normalizing the raw input along a temporal axis of a multivariate input tensor;

feed the normalized input into the first FC branch, wherein the first FC branch is configured to identify short-term relational temporal dynamics between features included in the normalized input; and use the multi-branch neural network to generate a latent inference based on outputs provided by the LSTM branch, the first FC branch, and the second FC branch.

11. The computer system of claim 10, wherein:

the first FC branch includes three stacked convolutional layers, each stacked convolutional layer is succeeded by batch normalization and rectified linear unit (ReLU) activation, and squeeze-and-excite (SE) blocks are appended to edges of only two of the ReLU activations.

12. The computer system of claim 10, wherein the multi-branch neural network includes only the LSTM branch and no other LSTM branches.

13. The computer system of claim 10, wherein a power cost for using the multi-branch neural network to generate the latent inference on the one or more edge nodes is 1.2 mW per inference.

14. The computer system of claim 10, wherein a power cost for using the multi-branch neural network to generate the latent inference on the one or more edge nodes is less than 23 mW per inference.

15. The computer system of claim 10, wherein a time consumed for using the multibranch neural network to generate the latent inference on the one or more edge nodes is less than 27 ms.

16. The computer system of claim 10, wherein the multi-branch neural network is trained across at least 300 epochs with a batch size of at least 128.

17. The computer system of claim 10, wherein the LSTM branch includes a dropout layer with a dropout rate of 0.8 to prevent overfitting.

18. One or more hardware storage devices that store instructions that are executable by one or more processors of a computer system to cause the computer system to:

configure a multi-branch neural network to include a long short-term memory (LSTM) branch, a first fully convolutional (FC) branch, and a second FC branch, wherein the LSTM branch, the first FC branch, and the second FC branch operate in parallel with one another;

cause the multi-branch neural network to be deployed on one or more edge nodes of an edge network, wherein the one or more edge nodes are configured to receive raw input from one or more sensors operating in the edge network;

feed the raw input into the LSTM branch and into the second FC branch, wherein the LSTM branch is configured to identify long-term trends within the raw input, and wherein the second FC branch is configured to identify magnitudes and trends between features included in the raw input;

feed the raw input into a normalization block that performs feature-wise normalization on the raw input to generate normalized input, wherein the normalization block performs the feature-wise normalization on the raw input by normalizing the raw input along a temporal axis of a multivariate input tensor;

feed the normalized input into the first FC branch, wherein the first FC branch is configured to identify short-term relational temporal dynamics between features included in the normalized input; and use the multi-branch neural network to generate a latent inference based on outputs provided by the LSTM branch, the first FC branch, and the second FC branch.

19. The one or more hardware storage devices of claim 18, wherein:

a time consumed for using the multi-branch neural network to generate the latent inference on the one or more edge nodes is less than 27 ms, and a power cost for using the multi-branch neural network to generate the latent inference on the one or more edge nodes is less than 23 mW per inference.

* * * * *